A. WINTON.
DRIVING SHAFT FOR AUTOMOBILES.
APPLICATION FILED APR. 29, 1907.
1,031,222.
Patented July 2, 1912.
2 SHEETS—SHEET 2.
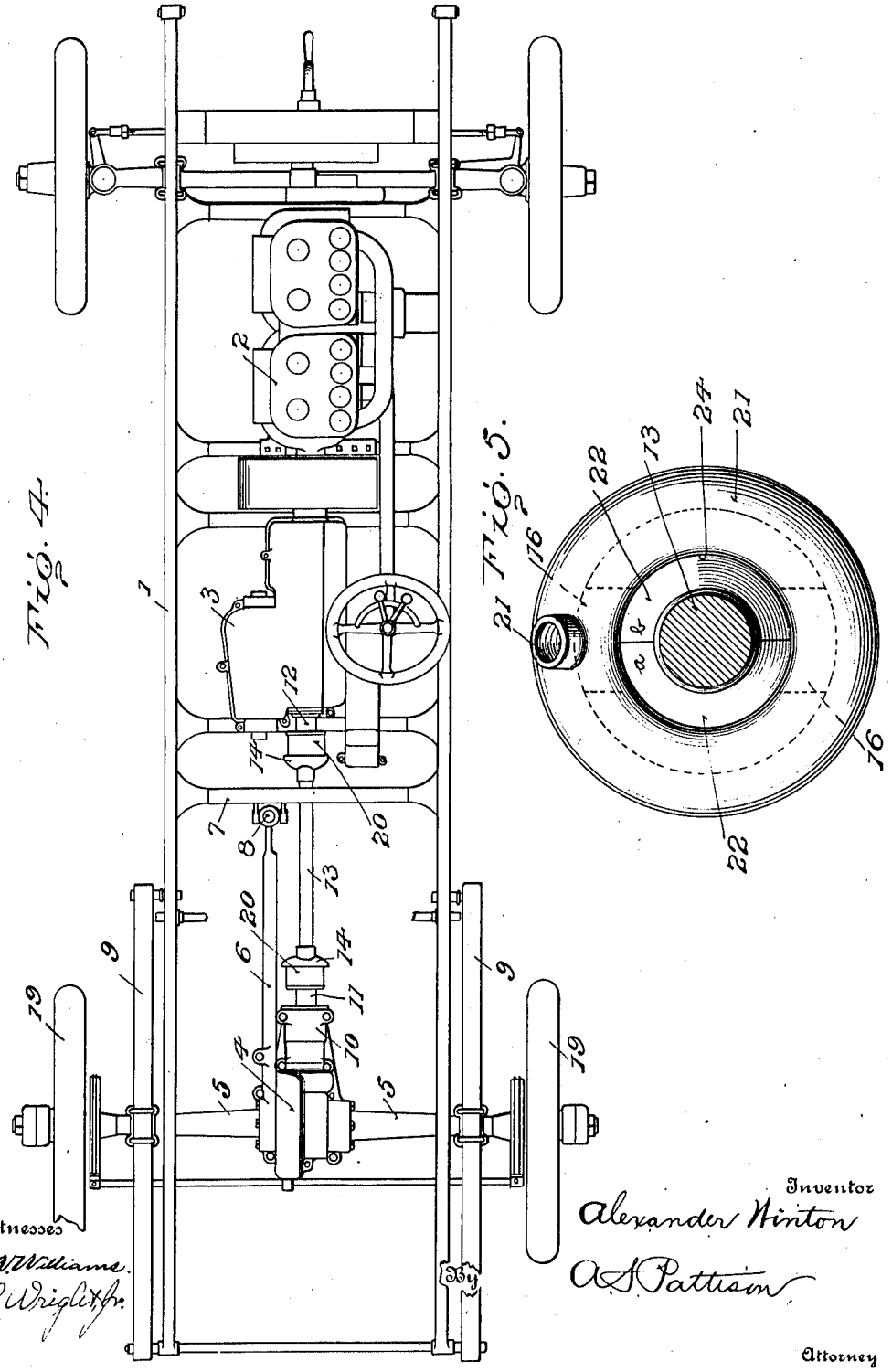

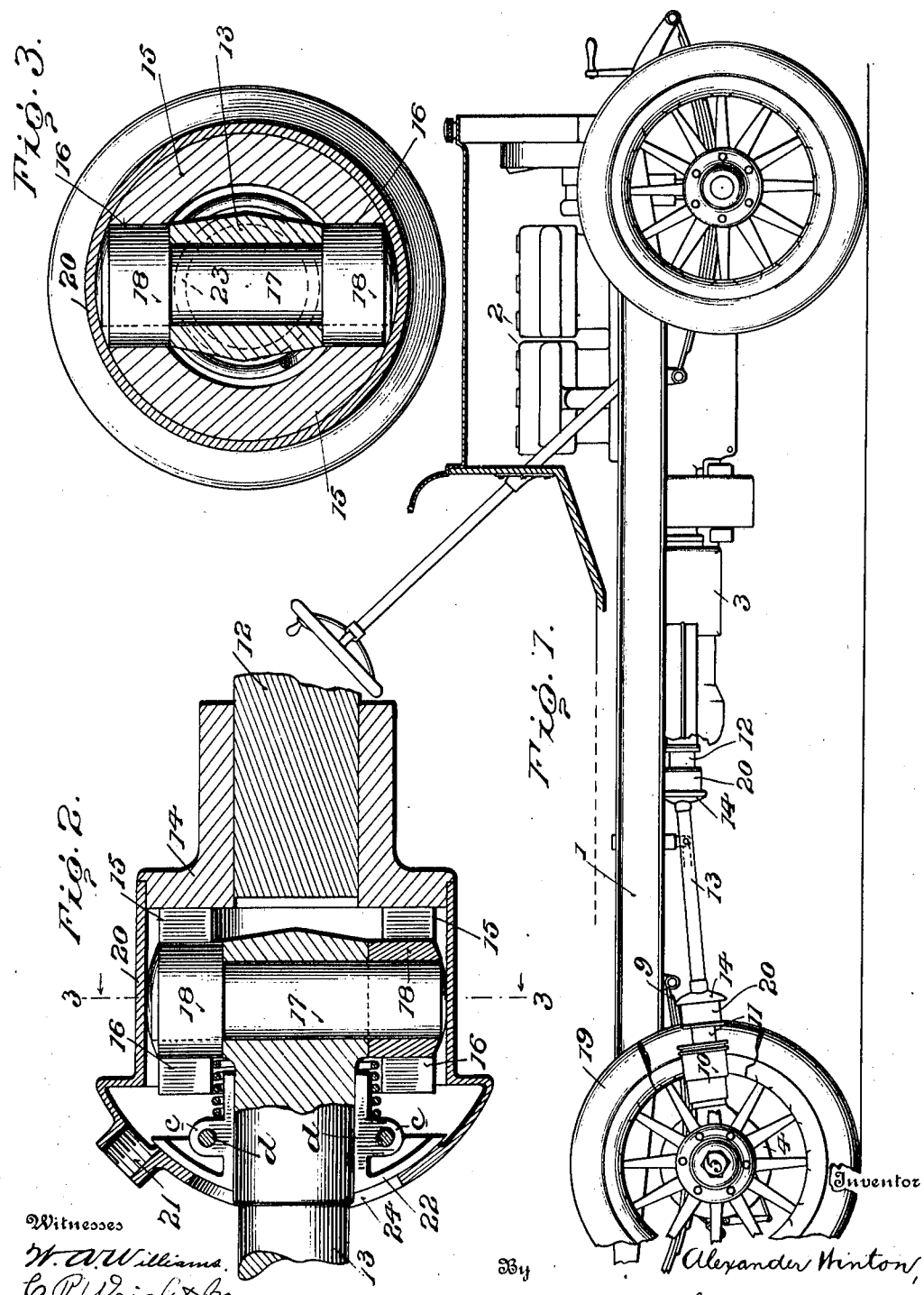

UNITED STATES PATENT OFFICE.

ALEXANDER WINTON, OF CLEVELAND, OHIO.

DRIVING-SHAFT FOR AUTOMOBILES.

1,031,222. Specification of Letters Patent. Patented July 2, 1912.

Application filed April 29, 1907. Serial No. 370,969.

*To all whom it may concern:*

Be it known that I, ALEXANDER WINTON, a citizen of the United States, residing at Cleveland, in the county of Cuyahoga and State of Ohio, have invented certain new and useful Improvements in Driving-Shafts for Automobiles, of which the following is a specification, reference being had therein to the accompanying drawing.

This invention relates to improvements in driving shafts for automobiles, the object of which is to provide an improved flexible or universal connection for the adjacent ends of the sections of the shaft between the source of power and the driving axle of the vehicle, whereby the driving shaft may extend at an angle or out of line with the shafting of the driving mechanism, and furthermore, whereby the driving axle of the vehicle may move up and down, or out of line with the shafting of the driving or transmission mechanism, without any binding effect upon the bearings of the driving shaft.

In the accompanying drawings, Figure 1, is a side elevation of an automobile chassis, partly broken away to disclose the rear end of the driving shaft. Fig. 2, is an enlarged longitudinal sectional view through the movable or universal connections at the adjacent ends of the sections of the driving shaft. Fig. 3, is a view on the line 3—3 of Fig. 2. Fig. 4, is a plan view of an automobile chassis showing the relative position and arrangement of the improved driving shaft with the other parts of the automobile mechanism. Fig. 5, is a detached view of the inclosing washer.

For the purpose of making clear the particular functions of the constructions of the improved driving shaft connections hereinafter described and claimed, its relation to the other parts of the automobile mechanism is illustrated in Figs. 1 and 4. In these figures, 1 is the frame of the automobile, 2 the engine, 3 the transmission mechanism box, and 4 the compensating gear box for the driving shaft or axle inclosed within the casing 5, and shown in dotted lines. The compensating gear box 4 is connected with the frame of the vehicle by means of a forwardly-extending strut or brace-bar 6 which has its forward end swiveled to the cross-bar 7 at the point 8, which permits the rear driving shaft, together with its inclosing casing 5 and compensating gear box 4 to move up and down by reason of its yielding connection with the frame of the vehicle through the medium of the springs 9.

Projecting forward from the compensating gear box 4 is an extended casing 10 in which a short shaft 11 is journaled, and projecting rearwardly from the gear case 3 is the transmission driving shaft 12. Located between these shafts 11 and 12 is a sectional shaft member 13, which (for reasons hereafter appearing) may be aptly termed the floating member of the driving shaft, the shafts 11 and 12 constituting what may be termed (for convenience of description) the fixed members of the driving shaft. One end of the member 13 is flexibly connected with the member or shaft 11, and the other end is flexibly connected with the member or shaft 12. Each of these flexible connections is alike, and the construction of one only need be specifically illustrated and described. The construction of these connections is illustrated in Figs. 2, 3 and 5. Referring now to Figs. 2, 3 and 5, the construction of these connections will be explained. The shafts 11 and 12, (or fixed members of the driving shaft) are provided with a casting 14, which in effect forms an enlarged head for the fixed members, and these heads are provided with flanged portions 15 having longitudinal slots 16. The floating member 13 of the driving shaft has its ends inclosed or embraced by the flanges 15, and passing through each of these ends is a pin 17, the pin projecting into the said slots 16 and carrying rollers or sleeves 18, which fit snugly the walls of the said slots. From this construction, it will be observed that when the shaft 12 is rotated it in turn rotates the floating member 13, and the floating member rotates the fixed member or shaft 11, which in turn, through the medium of the compensating gear, propels the driving shaft in a manner well understood by those skilled in this art, and which need not be illustrated or further described so far as the present invention is concerned. The arrangement of connections furthermore permits a sliding or oscillating movement of the floating member in respect to the fixed members in one direction, and an oscillating movement in the other direction, whereby the floating member may extend at an angle or out of line with either one or both of the fixed members, and whereby the propelling shaft to which the supporting and driving wheels 19 are connected, may vibrate back and forth under the strain of running on the road without any binding of the parts. In other words, a universal connection between the fixed members and the floating member is provided, which allows for any increase or decrease of the distance between the transmission gearing and the rear axle, or for any vibration of the rear driving axle on account of the propelling of the vehicle, and especially on rough roads, and without any tendency to the binding of any of the parts. For the purpose of inclosing these connections and protecting them from dust, mud, or dirt, an inclosing cap 20 is provided, and this inclosing cap has its inner edge suitably connected with the head 14. By reference to Fig. 2 it will be seen that the ends of the pin 17 are substantially in engagement with the inner wall of the cap 20, which serves to hold the pin in position, and that the ends of the pin and the outer end of the sleeves or rollers 18 are curved on the arc of a circle, drawn from the central point of the pin 17, whereby the pin is permitted to freely rock within the inclosing cap or casing. The opposite end of the cap 20 is provided with a head 21 of a spherical shape, and preferably having its inner end of a larger diameter than the main or body portion 20 of the cap, to permit a sufficient movement of a spring-held washer 22 located within the head 21 to accommodate the extreme movements of the floating member 13. This spring inclosing washer 22 has an outer spherical surface corresponding to the spherical inner surface of the head and is held in contact therewith by means of a suitable spring 23. This washer serves to close the circular opening 24 through which the end of the floating member 13 extends, and is thereby permitted to move in all directions independently of the inclosing cap and head 21. To enable the assembling of the spring washer, it is made of two parts, $a$ and $b$, (Fig. 5) and these members are provided with registering perforated ears $c$ through which suitable clamping members $d$ pass.

By reference to Fig. 2, it will be seen that the cap or casing 20 is a piece separate from the head or flange 14, and that it may be attached and removed therefrom. It will also be observed that this flange or head is of a diameter greater than the diameter of the washer 22, so that the inner end of the casing 20, when removed from the head, is larger in internal diameter than the external diameter of the washer 22, whereby the cap or casing may be moved over the washer 22 after it is in place for attachment to the head 14, or the casing moved longitudinally over the washer when it is detached for the purpose of permitting access to the connection of the shaft sections 12 and 13, or to the washer 22. It will also be observed from this figure that the opening 24 in the free end of the cap 20 is larger in diameter than the greatest cross-sectional length of the pivotal end of the shaft section 13, which enables the cap 20 to receive, or permit the large pivotal end of the section 13 to pass through the said opening, either within or withdrawn from the cap or casing. These features enable the ready and convenient assembling and disassembling of the parts.

While I have illustrated the floating member with a flexible connection at each end as the preferred construction, as it is found to have certain advantages in practical operation, yet I desire it to be understood that in some arrangements of the mechanisms of an automobile a single joint or connection of the construction herein described may be advantageously used.

Having thus described my invention, what I claim and desire to secure by Letters Patent, is:—

A shaft connection comprising an inner and an outer shaft section, a connection for the ends of the shafts permitting relative lateral and longitudinal movements, a casing secured to the outer section embracing and extending beyond said connection to form a washer chamber, a sliding washer within the chamber and having an inwardly-projecting bearing on the end of the inner shaft section, whereby the washer is entirely within the casing and protected from dirt, the inner surface of the casing and the outer surface of the outer end of the washer having spherical engaging surfaces, and an expanding spring located between the washer and the head of the inner section.

In testimony whereof I affix my signature in presence of two witnesses.

ALEXANDER WINTON.

Witnesses:
 HAROLD B. ANDERSON,
 I. F. BAUGHMAN.